United States Patent [19]

Fite et al.

[11] Patent Number: 5,113,515
[45] Date of Patent: May 12, 1992

[54] VIRTUAL INSTRUCTION CACHE SYSTEM USING LENGTH RESPONSIVE DECODED INSTRUCTION SHIFTING AND MERGING WITH PREFETCH BUFFER OUTPUTS TO FILL INSTRUCTION BUFFER

[75] Inventors: David B. Fite; Ricky C. Hetherington, both of Northboro; Michael M. McKeon, Grafton; Dwight P. Manley, Holliston; John E. Murray, Acton, all of Mass.

[73] Assignee: Digital Equipment Corporation, Maynard, Mass.

[21] Appl. No.: 306,831

[22] Filed: Feb. 3, 1989

[51] Int. Cl.⁵ .............................................. G06F 9/30
[52] U.S. Cl. ........................... 395/425; 364/259.9; 364/259.5; 364/243.42; 364/243.4; 364/DIG. 1
[58] Field of Search ... 364/200 MS File, 900 MS File

[56] References Cited

U.S. PATENT DOCUMENTS

| | | | |
|---|---|---|---|
| 3,771,138 | 11/1973 | Celtruda | 364/200 |
| 4,454,578 | 6/1984 | Matsumoto et al. | 364/200 |
| 4,500,958 | 2/1985 | Kubo et al. | 364/200 |
| 4,521,850 | 6/1985 | Wilhite | 364/200 |
| 4,602,368 | 7/1986 | Circello | 364/900 |
| 4,626,988 | 12/1986 | George | 364/200 |
| 4,635,194 | 1/1987 | Burger | 364/200 |
| 4,719,570 | 1/1988 | Kawabe | 364/200 |
| 4,722,050 | 1/1988 | Lee | 364/200 |
| 4,725,947 | 2/1988 | Shonai | 364/200 |
| 4,755,933 | 7/1988 | Teshima | 364/200 |
| 4,853,840 | 8/1989 | Shibuya | 364/200 |
| 4,860,192 | 8/1989 | Sachs | 364/200 |
| 4,879,687 | 11/1989 | Okamoto | 365/49 |
| 4,953,121 | 8/1990 | Muller | 364/900 |
| 4,989,140 | 1/1991 | Nishimakai | 364/200 |

OTHER PUBLICATIONS

Fossum et al., "an Overview of the VAX 8600 System," Digital Equipment Technical Journal, No. 1, Aug. 1985, pp. 8-23.

Troiani et al., "The VAX 8600 I box, A Pipelined Implementation of the VAX Architecture," Digital Technical Journal, No. 1, Aug. 1985, pp. 24-42.

Primary Examiner—Thomas C. Lee
Assistant Examiner—Eric Coleman
Attorney, Agent, or Firm—Arnold, White & Durkee

[57] ABSTRACT

An instruction buffer of a high speed digital computer controls the flow of instruction stream to an instruction decoder. The buffer provides the decoder with nine bytes of sequential instruction stream. The instruction set used by the computer is of the variable length type, such that the decoder consumes a variable number of the instruction stream bytes, depending upon the type of instruction being decoded. As each instruction is consumed, a shifter removes the consumed bytes and repositions the remaining bytes into the lowest order positions. The byte positions left empty by the shifter are filled by instruction stream retrieved from one of a pair of prefetch buffers (IBEX, IBEX2) or from a virtual instruction cache. These prefetch buffers are arranged to hold the next two subsequent quadwords of instruction stream and provide the desired missing bytes. The IBEX prefetch buffer is filled from the instruction cache after being emptied, but prior to those particular bytes being requested to fill the instruction decoder. This two level prefetching allows the relatively slow process of cache access to be performed during noncritical time. The instruction decoder is not stalled, waiting for a cache refill, but can ordinarily obtain the desired bytes of instruction stream from the prefetch buffer.

9 Claims, 9 Drawing Sheets

VIRTUAL INSTRUCTION CACHE SYSTEM USING LENGTH RESPONSIVE DECODED INSTRUCTION SHIFTING AND MERGING WITH PREFETCH BUFFER OUTPUTS TO FILL INSTRUCTION BUFFER

BACKGROUND OF THE INVENTION

1. Related Applications

The present application discloses certain aspects of a computing system that is further described in the following U.S. patent applications filed concurrently with the present application: Evans et al., AN INTERFACE BETWEEN A SYSTEM CONTROL UNIT AND A SERVICE PROCESSING UNIT OF A DIGITAL COMPUTER, Ser. No. 07/306,325 filed Feb. 3, 1989; Arnold et al., METHOD AND APPARATUS FOR INTERFACING A SYSTEM CONTROL UNIT FOR A MULTIPROCESSOR SYSTEM WITH THE CENTRAL PROCESSING UNITS, Ser. No. 07/306,837 filed Feb. 3, 1989; Gagliardo et al., METHOD AND MEANS FOR INTERFACING A SYSTEM CONTROL UNIT FOR A MULTI-PROCESSOR SYSTEM WITH THE SYSTEM MAIN MEMORY, Ser. No. 07/306,326 filed Feb. 3, 1989 now abandoned; D. Fite et al., METHOD AND APPARATUS FOR RESOLVING A VARIABLE NUMBER OF POTENTIAL MEMORY ACCESS CONFLICTS IN A PIPELINED COMPUTER SYSTEM, Ser. No. 07/306,767 filed Feb. 3, 1989; D. Fite et al., DECODING MULTIPLE SPECIFIERS IN A VARIABLE LENGTH INSTRUCTION ARCHITECTURE, Ser. No. 07/307,347 filed Feb. 3, 1989; D. Fite et al., VIRTUAL INSTRUCTION CACHE REFILL ALGORITHM, Ser. No. 07/306,831 filed Feb. 3, 1989; Murray et al., PIPELINE PROCESSING OF REGISTER AND REGISTER MODIFYING SPECIFIERS WITHIN THE SAME INSTRUCTION, Ser. No. 07/306,833 filed Feb. 3, 1989; Murray et al., MULTIPLE INSTRUCTION PREPROCESSING SYSTEM WITH DATA DEPENDENCY RESOLUTION FOR DIGITAL COMPUTERS, Ser. No. 07/306,773 filed Feb. 3, 1989; Murray et al., PREPROCESSING IMPLIED SPECIFIERS IN A PIPELINED PROCESSOR, Ser. No. 07/306,846 filed Feb. 3, 1989; D. Fite et al., METHOD OF BRANCH PREDICTION, Ser. No. 07/306,760 filed Feb. 3, 1989; Fossum et al., PIPELINED FLOATING POINT ADDER FOR DIGITAL COMPUTER, Ser. No. Ser. No. 07/306,343 filed Feb. 3, 1989 now U.S. Pat. No. 4,994,996; Grundmann et al., SELF TIMED REGISTER FILE, Ser. No. 07/306,445 filed Feb. 3, 1989; Beaven et al., METHOD AND APPARATUS FOR DETECTING AND CORRECTING ERRORS IN A PIPELINED COMPUTER SYSTEM, Ser. No. 07/306,838 filed Feb. 3, 1989 and issued as U.S. Pat. No. 4,982,402 on Jan. 1, 1991; Flynn et al., METHOD AND MEANS FOR ARBITRATING COMMUNICATION REQUESTS USING A SYSTEM CONTROL UNIT IN A MULTI-PROCESSOR SYSTEM, Ser. No. 07/306,871 filed Feb. 3, 1989; E. Fite et al., CONTROL OF MULTIPLE FUNCTION UNITS WITH PARALLEL OPERATION IN A MICROCODED EXECUTION UNIT, Ser. No. 07/306,832 filed Feb. 3, 1989 now U.S. Pat. No. 5,067,069; Webb, Jr. et al., PROCESSING OF MEMORY ACCESS EXCEPTIONS WITH PREFETCHED INSTRUCTIONS WITHIN THE INSTRUCTION PIPELINE OF A VIRTUAL MEMORY SYSTEM-BASED DIGITAL COMPUTER, Ser. No. 07/306,866 filed Feb. 3, 1989 now U.S. Pat. No. 4,985,825; Heterhington et al., METHOD AND APPARATUS FOR CONTROLLING THE CONVERSION OF VIRTUAL TO PHYSICAL MEMORY ADDRESSES IN A DIGITAL COMPUTER SYSTEM, Ser. No. 07/306,544 filed Feb. 3, 1989 now abandoned; Hetherington et al., WRITE BACK BUFFER WITH ERROR CORRECTING CAPABILITIES, Ser. No. 07/306,703 filed Feb. 3, 1989 now U.S. Pat. No. 4,895,041; Chinnasway et al., MODULAR CROSSBAR INTERCONNECTION NETWORK FOR DATA TRANSACTIONS BETWEEN SYSTEM UNITS IN A MULTI-PROCESSOR SYSTEM, Ser. No. 07/306,336 filed Feb. 3, 1989, and issued as U.S. Pat. No. 4,968,977 on Nov. 6, 1990; Polzin et al., METHOD AND APPARATUS FOR INTERFACING A SYSTEM CONTROL UNIT FOR A MULTI-PROCESSOR SYSTEM WITH INPUT/OUTPUT UNITS, Ser. No. 07/306,862 filed Feb. 3, 1989, and issued as U.S. Pat. No. 4,965,793 on Oct. 23, 1990; Gagliardo et al., MEMORY CONFIGURATION FOR USE WITH MEANS FOR INTERFACING A SYSTEM CONTROL UNIT FOR A MULTI-PROCESSOR SYSTEM WITH THE SYSTEM MAIN MEMORY, Ser. No. 07/306,404 filed Feb. 3, 1989 now U.S. Pat. No. 5,043,874; and Gagliardo et al., METHOD AND MEANS FOR ERROR CHECKING OF DRAM-CONTROL SIGNALS BETWEEN SYSTEM MODULES, Ser. No. 07/306,836 filed Feb. 2, 1989 now abandoned.

2. Technical Field

This invention relates generally to a virtual instruction cache (VIC) of a high-speed digital computer and, more particularly, to controlling the VIC to prefetch and align variable length instructions.

Description of Related Art

In the field of high speed computers, most advanced computers pipeline the entire sequence of instruction activities. A prime example is the VAX 8600 computer manufactured and sold by Digital Equipment Corporation, 111 Powdermill Road, Maynard Mass. 97154-1418. The instruction pipeline for the VAX 8600 is described in T. Fossum et al. "An Overview of the VAX 8600 System," *Digital Technical Journal*. No. 1, Aug. 1985, pp. 8-23. Separate pipeline stages are provided for instruction fetch, instruction decode, operand address generation, operand fetch, instruction execute, and result store.

To make effective use of this pipelining capability, it is desirable to keep each stage of the pipeline occupied, performing its intended function on the next instruction to be executed. In order to do this, the instruction fetch stage must retrieve an instruction and pass it to the next stage between each transition of the system clock. Otherwise, such a disruption in the instruction stream causes the pipeline to drain, necessitating a time-consuming restart of the entire pipeline. Of course, the purpose of the pipeline is to increase the overall speed of the computer. Thus, it is highly advantageous to avoid these situations where the pipeline is interrupted.

However, the instruction set employed in some computers is of the variable length type, thereby forcing the instruction buffer to have added complexity. In other words, until the instruction (opcode) is decoded, the instruction buffer does not "know" how many of the subsequent bytes of the instruction stream belong with the current instruction. Therefore, the instruction buffer can only respond by loading a preselected number of bytes of the instruction stream, which may or may not include an entire instruction. The instruction decoder will only consume those bytes associated with the immediate instruction. Thereafter, the instruction buffer must determine how many of the present bytes were used by the decoder, shift the unused bytes into the lowest order locations, and then fill the empty buffer locations with subsequent bytes of the instruction stream.

Reference to the main memory to retrieve these subsequent bytes of instruction stream necessarily involves multiple clock cycles. To avoid accessing main memory, many digital computers include a high speed cache between the processing unit and the main memory. Access to this cache takes only a small number of cycles of the processor's clock but often involves translating virtual addresses to physical addresses. To further accelerate the access to the instruction stream, some systems dedicate a cache solely to store the instructions. The access to this "instruction cache" often does not entail translating from virtual to physical addresses as the instructions are stored under their virtual addresses. This access to the instruction stream in a high speed virtual instruction cache may only involve one cycle of the processor's clock.

The virtual instruction cache, however, contains only a portion of the main memory, each reference to the virtual instruction cache involves comparing the requested address with the desired address to first determine if the desired instruction stream is present and then retrieving the requested instruction stream. Therefore, owing to the variable length nature of the instruction set, the instruction buffer cannot predict whether a reference to the VIC will be required by the instruction currently being decoded.

To prevent numerous references to the virtual instruction cache, a prefetch buffer is provided to maintain a preselected number of the subsequent bytes of instruction stream which are expected to be used by the instruction decoder. This process forestalls the inevitable reference to the virtual instruction cache.

Since the virtual instruction cache contains only a portion of the instruction stream, refills to the instruction buffer can result in "misses" in the virtual instruction cache, which require fetches from the main memory. These main memory fetches generally require many clock cycles, thereby interrupting the pipeline.

SUMMARY OF THE INVENTION

To ensure that the instruction pipeline of a digital computer remains full to provide for fast and efficient execution of the instructions, an instruction buffer includes first and second prefetch buffers for storing a preselected number of subsequent bytes of instruction stream. The first prefetch buffer is independently addressable to retrieve a selected number of sequential bytes contained therein. Means are provided for refilling the decoder with the number of sequential bytes of instruction stream corresponding to the number of bytes currently being decoded. The refill means retrieves the instruction stream bytes from the first prefetch buffer sequentially and sets a "valid bit" corresponding to each byte of instruction stream retrieved. The second instruction buffer need only contain all valid or all invalid bytes, and therefore only one valid bit need be held for the second instruction buffer. The first prefetch buffer is refilled with the preselected number of subsequent instruction stream bytes in response to all of the valid bits corresponding to each byte of the instruction stream contained therein being clear. Similarly, the second prefetch buffer is refilled with the preselected number of subsequent instruction stream bytes when it becomes empty.

BRIEF DESCRIPTION OF THE DRAWINGS

Other objects and advantages of the invention will become apparent upon reading the following detailed description and upon reference to the drawings in which.

Figure 1:
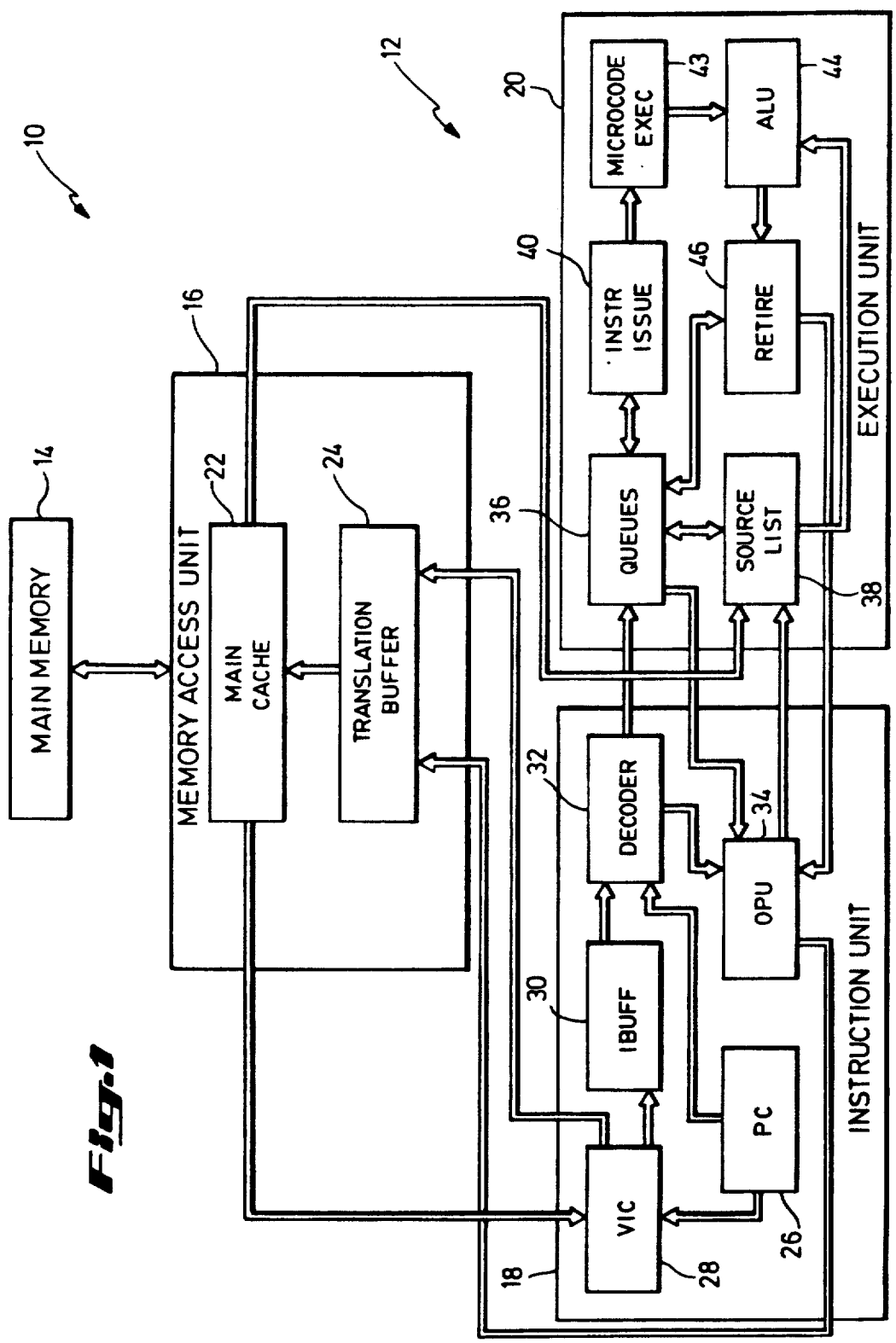
FIG. 1 is a top level block diagram of a portion of a central processing unit and associated memory.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings, FIG. 1 is a top level block diagram of a portion of a pipelined computer system 10. The system 10 includes at least one central processing unit (CPU) 12 having access to main memory 14. It should be understood that additional CPUs could be used in such a system by sharing the main memory 14.

Inside the CPU 12, the execution of an individual instruction is broken down into multiple smaller tasks. These tasks are performed by dedicated, separate, independent functional units that are optimized for that purpose.

Although each instruction ultimately performs a different operation, many of the smaller tasks into which each instruction is broken are common to all instructions. Generally, the following steps are performed during the execution of an instruction: instruction fetch, instruction decode, operand fetch, execution, and result store. Thus, by the use of dedicated hardware stages, the steps can be overlapped, thereby increasing the total instruction throughput.

The data path through the pipeline includes a respective set of registers for transferring the results of each pipeline stage to the next pipeline stage. These transfer registers are clocked in response to a common system clock. For example, during a first clock cycle, the first instruction is fetched by hardware dedicated to instruction fetch. During the second clock cycle, the fetched instruction is transferred and decoded by instruction decode hardware, but, at the same time, the next instruction is fetched by the instruction fetch hardware. During the third clock cycle, each instruction is shifted to the next stage of the pipeline and a new instruction is fetched. Thus, after the pipeline is filled, an instruction will be completely executed at the end of each clock cycle.

This process is analogous to an assembly line in a manufacturing environment. Each worker is dedicated to performing a single task on every product that passes through his or her work stage. As each task is performed the product comes closer to completion. At the final stage, each time the worker performs his or her assigned task a completed product rolls off the assembly line.

As shown in FIG. 1, each CPU 12 is partitioned into at least three functional units: the memory access unit 16, the instruction unit 18, and the execution unit 20.

The memory access unit 16 includes a main cache 22 which, on an average basis, enables the instruction and execution units 18, 20 to process data at a faster rate than the access time of the main memory 14. This cache 22 includes means for storing selected predefined blocks of data elements, means for receiving requests from the instruction unit 18 via a translation buffer 24 to access a specified data element, means for checking whether the data element is in a block stored in the cache 22, and means operative when data for the block including the specified data element is not so stored for reading the specified block of data in the cache 22. In other words, the cache provides a "window" into the main memory, and contains data likely to be needed by the instruction and execution units 18, 20. The organization and operation of a similar cache and translation buffer are further described in Chapter 11 of Levy and Eckhouse, Jr., *Computer Programming and Architecture, The VAX*-11, Digital Equipment Corporation, pp. 351-368 (1980).

If a data element needed by the instruction and execution units 18, 20 is not found in the cache 22, then the data element is obtained from the main memory 14, but in the process, an entire block, including additional data, is obtained from the main memory 14 and written into the cache 22. Due to the principle of locality in time and memory space, the next time the instruction and execution units desire a data element, there is a high degree of likelihood that this data element will be found in the block which includes the previously addressed data element. Consequently, it is probable that the cache 22 will already include the data element required by the instruction and execution units 18, 20. In general, since the cache 22 is accessed at a much higher rate than the main memory 14, the main memory 14 can have a proportionally slower access time than the cache 22 without substantially degrading the average performance of the computer system 10. Therefore, the main memory 14 is constructed of slower and less expensive memory elements.

The translation buffer 24 is a high speed associative memory which stores the most recently used virtual-to-physical address translations. In a virtual memory system, a reference to a single virtual address can cause several memory references before the desired information is made available. However, where the translation buffer 24 is used, translation is reduced to simply finding a "hit" in the translation buffer 24.

The instruction unit 18 includes a program counter 26 and a virtual instruction cache (VIC) 28 for fetching instructions from the main cache 22. The program counter 26 preferably addresses virtual memory locations rather than the physical memory locations of the main memory 14 and the cache 22. Thus, the virtual address of the program counter 26 must be translated into the physical address of the main memory 14 before instructions can be retrieved. Accordingly, the contents of the program counter 26 are transferred to the memory access unit 16 where the translation buffer 24 performs the address conversion. The instruction is retrieved from its physical memory location in the cache 22 using the converted address. The cache 22 delivers the instruction over data return lines to the VIC 28.

Generally, the VIC 28 contains prestored instructions at the addresses specified by the program counter 26, and the addressed instructions are available immediately for the transfer into an instruction buffer (IBUFFER) 30. From the buffer 30, the addressed instructions are fed to an instruction decoder 32 which decodes both the opcodes and the specifiers. An operand processing unit (OPU) 34 fetches the specified operands and supplies them to the execution unit 20.

The OPU 34 also produces virtual addresses. In particular, the OPU 34 produces virtual addresses for memory source (read) and destination (write) operands. For the memory read operands, the OPU 34 delivers these virtual addresses to the memory access unit 16 where they are translated to physical addresses. The physical memory locations of the cache 22 are then accessed to fetch the operands for the memory source operands.

In each instruction, the first byte contains the opcode, and the following bytes are the operand specifiers to be decoded. The first byte of each specifier indicates the addressing mode for that specifier. This byte is usually broken in halves, with one-half specifying the addressing mode and the other half specifying a register to be used for addressing. The instructions preferably have a variable length, and various types of specifiers can be used with the same opcode, as disclosed in Strecker et al., U.S. Pat. No. 4,241,397 issued Dec. 23, 1980.

The first step in processing the instructions is to decode the opcode portion of the instruction. The first portion of each instruction consists of its opcode which specifies the operation to be performed in the instruction, and the number and type of specifiers to be used. Decoding is accomplished using a table-look-up technique in the instruction decoder 32. Later, the execution unit 20 performs the specified operation by executing prestored microcode, beginning at a predetermined starting address for the specified operation. Also, the decoder 32 determines where source-operand and destination-operand specifiers occur in the instruction and passes these specifiers to the OPU 34 for preprocessing prior to execution of the instruction. A preferred instruction decoder for use with the refill method and apparatus of the present invention is described in the above referenced D. Fite et al. U.S. patent application Ser. No. 07/306,347, filed Feb. 3, 1989, and entitled "Decoding Multiple Specifiers in a Variable Length Instruction Architecture," incorporated herein by reference.

After an instruction has been decoded, the OPU 34 parses the operand specifiers and computes their effective addresses; this process involves reading GPRs and possibly modifying the GPR contents by autoincrementing or autodecrementing. The operands are then fetched from those effective addresses and passed on to the execution unit 20, which executes the instruction and writes the result into the destination identified by the destination pointer for that instruction.

Each time an instruction is passed to the execution unit 20, the instruction unit 18 sends a microcode dispatch address and a set of pointers for (1) the location in the execution unit register file where the source operands can be found, and (2) the location where the results are to be stored. Within the execution unit 20, a set of queues 36 includes a fork queue for storing the microcode dispatch address, a source pointer queue for storing the source-operand locations, and a destination pointer queue for storing the destination location. Each of these queues is a FIFO buffer capable of holding the data for multiple instructions.

The execution unit 20 also includes a source list 38, which is a multi-ported register file containing a copy of the GPRs and a list of source operands. Thus, entries in the source pointer queue will either point to GPR locations for register operands, or point to the source list for memory and literal operands. Both the memory access unit 16 and the instruction unit 18 write entries in the source list 38, and the execution unit 20 reads operands out of the source list 38 as needed to execute the instructions. For executing instructions, the execution unit 20 includes an instruction issue unit 40, a microcode execution unit 42, an arithmetic and logic unit (ALU) 44, and a retire unit 46.

Figure 2:
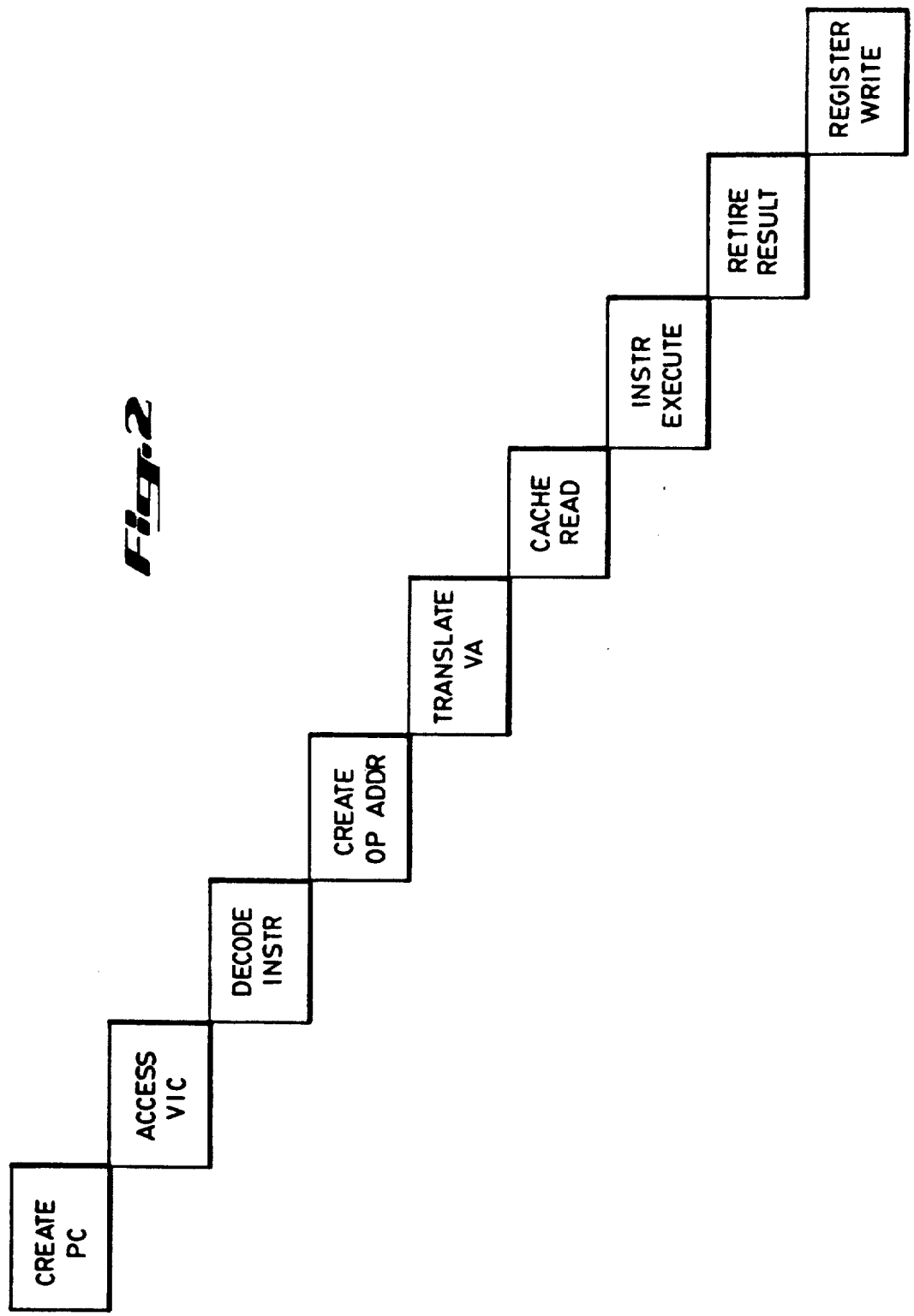
FIG. 2 is a functional diagram of the pipeline processing of a longword ADD operand.

The present invention is particularly useful with pipelined processors. As discussed above, in a pipelined processor, the processor's instruction fetch hardware may be fetching one instruction while other hardware is decoding the operation code of a second instruction, fetching the operands of a third instruction, executing a fourth instruction, and storing the processed data of a fifth instruction. FIG. 2 illustrates a pipeline for a typical instruction such as:

ADDL3 R0,B 122(R1),R2

This is a long-word addition using the displacement mode of addressing.

In the first stage of the pipelined execution of this instruction, the program count (PC) of the instruction is created; this is usually accomplished either by incrementing the program counter 26 from the previous instruction, or by using the target address of a branch instruction. The PC is then used to access VIC 28 in the second stage of the pipeline.

In the third stage of the pipeline, the instruction data is available from the cache 22 for use by the instruction decoder 32, or to be loaded into the IBUFFER 30. The instruction decoder 32 decodes the opcode and the three specifiers in a single cycle, as will be described in more detail below. The R0 and R2 numbers are passed to the ALU 44, and the R1 number along with the byte displacement is sent to the OPU 34 at the end of the decode cycle.

In stage four, the OPU 34 reads the contents of its GPR register file at location R1, adds that value to the specified displacement (12), and sends the resulting address to the translation buffer 24 in the memory access unit 16, along with an OP READ request, at the end of the address generation stage.

In stage five, the memory access unit 16 selects the address generated in stage four for execution. Using the translation buffer 24, the memory access unit 16 translates the virtual address to a physical address during the address translation stage. The physical address is then used to address the cache 22, which is read in stage six of the pipeline.

In stage seven of the pipeline, the instruction is issued to the ALU 44 which adds the two operands and sends the result to the retire unit 46. During stage 4, the register numbers for R1 and R2, and a pointer to the source list location for the memory data, are sent to the execution unit and stored in the pointer queues. Then during the cache read stage, the execution unit looks for the two source operands in the source list. In this particular example, it finds only the register data R0, but at the end of this stage the memory data arrives and is substituted for the invalidated read-out of the register file. Thus, both operands are available in the instruction execution stage.

In the retire stage eight of the pipeline, the result data is paired with the next entry in the retire queue. Although several functional execution units can be busy at the same time, only one instruction is retired in a single cycle.

In the last stage nine of the illustrative pipeline, the data is written into the GPR portion of the register files in both the execution unit 20 and the instruction unit 18.

Figure 3:
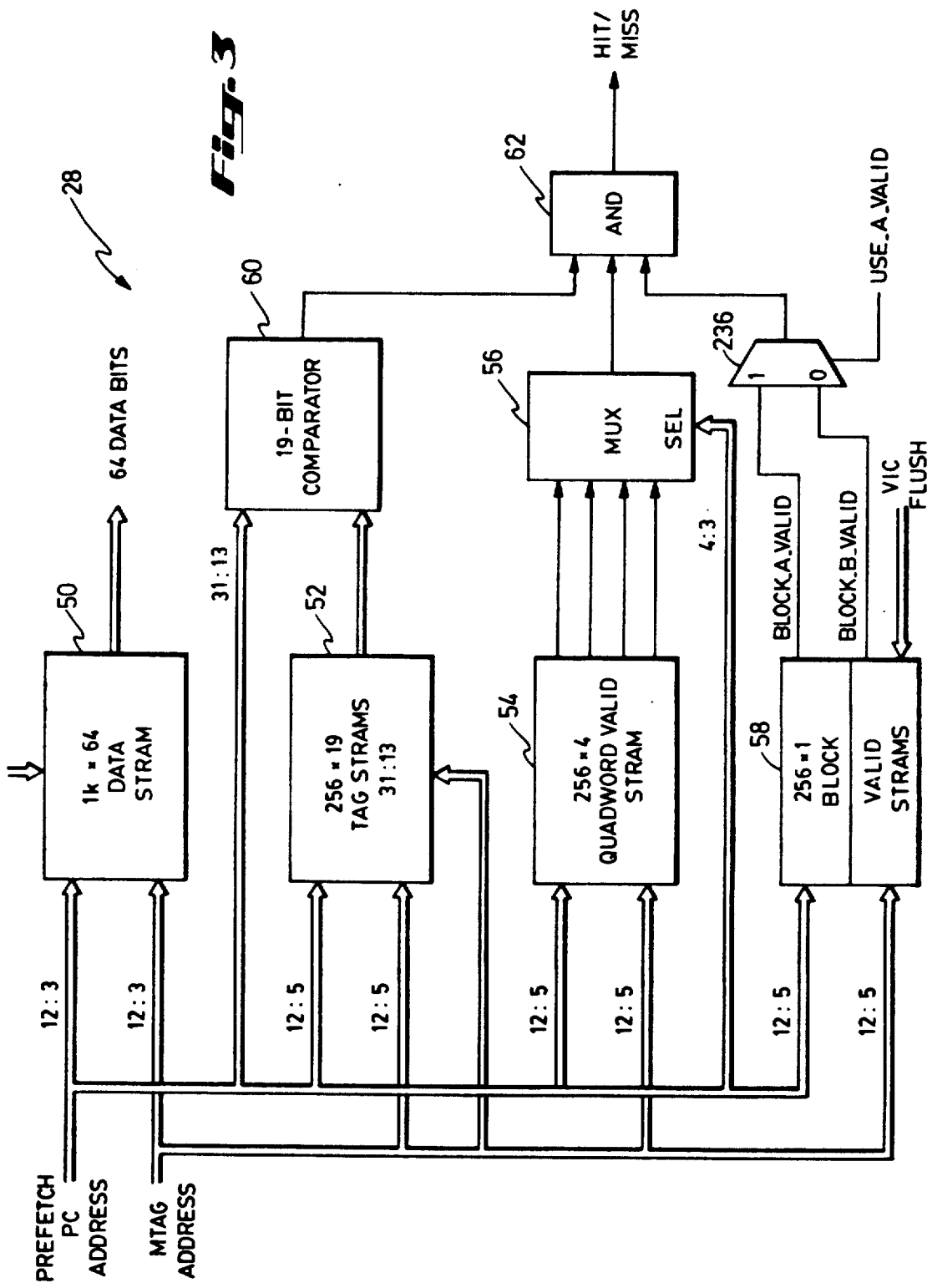
FIG. 3 is a block diagram of the virtual instruction cache.

Referring now to FIG. 3, a block diagram of the virtual instruction cache (VIC) 28 is illustrated. The VIC 28 is constructed of four groups of self-timed rams (STRAMS), and acts as a window into the main memory 14. In this regard the VIC 28 functions in a similar fashion as the main cache 22. The first group of VIC STRAMS is the data stram 50 which provides storage space for the actual instruction stream (ISTREAM) retrieved from the main cache 22. Specifically, the data stram 50 contains 1024 storage locations, with each storage location being 64-bits in width. From the size of the data stram 50, it should be apparent that the ISTREAM is retrieved in quadword (8-byte) packets. Accordingly, the data path between the main cache 22 and the VIC 28 is also 64-bits in width and a quadword of ISTREAM can be transferred during each system clock cycle.

The PC 26 delivers bits 12:3 of the 32-bit virtual address to the data stram 50 in order to address each quadword of ISTREAM. Bits 2:0 are unnecessary as they are only needed to address individual bytes within each quadword. Individual byte addressiblity is not necessary for the proper operation of the VIC 28. Rather, the smallest increment of ISTREAM which can be addressed in the VIC 28 is a quadword. Further, the upper bits 31:13 are not used to address the data stram 50 because only 1024 quadword locations are available for storing the ISTREAM. Accordingly, the 10-bits 12:3 are sufficient to provide a unique address for each of the 1024 data storage locations (i.e. $2^{10} = 1024$).

However, it should be clear that since the upper bits 31:13 are not used to address the data stram 50, there are multiple quadwords which must be stored at identical data stram locations. For example, the quadword located at address 1111111111111111110000000000 will be stored at the same data stram location as the quadword located at address 0111111111111111110000000000. Both addresses share the same lower 10-bits and must, therefore, share the same data stram storage location. In fact, each data stram location can host any one of 1,048,576 ($2^{19}$ = 1,048,576) quadwords.

Accordingly, in order to determine which of theses quadwords is stored in each of the data stram locations, a set of tag strams 52 is provided. The tag strams 52 store the upper nineteen bits 31:13 of the quadword address. However, ISTREAM is retrieved from the main cache 22 in four quadword blocks. In other words, a request to the main cache 22 for the first quadword in a block causes the main cache 22 to also return the three following quadwords. Retrieving ISTREAM in blocks satisfies the principle of locality in time and memory space and aids the overall performance of the VIC 28. Accordingly, the 1024 data stram locations are identified by only 256 tag stram locations (1 for each four quadword block). Thus, the tag stram 52 contains 256 19-bit storage locations and 8-bits (12:5) of the virtual address are sufficient to identify each of the 256 storage locations ($2^8$ = 256).

Operation of the VIC 28 is enhanced by the method used for retrieving ISTREAM from the main cache 22. The request for ISTREAM is always quadword aligned and can be for any quadword within a block. However, the main cache 22 only responds with the requested quadword and all subsequent quadwords to fill the block. Quadwords prior to the request in the block are not returned from the main cache 22. For example, if the VIC 28 requests the third quadword in a block, only the third and fourth quadwords are returned from the main cache 22 and are written into the data stram 50. This method of retrieving ISTREAM is employed for two reasons. First, by returning the requested quadword first, rather than the first quadword in that block, the requested ISTREAM address is available immediately and the critical response time is enhanced. Second, performance models indicate that the remainder of the block is hardly used.

Since it is possible for only a portion of a block to be present in the data stram 50, it is necessary to keep track of which quadwords are valid. Therefore, a quadword valid stram 54 is provided. A valid bit is maintained for each quadword in the data stram 50. The quadword valid stram 54 is organized similar to the tag stram 52, in that it contains 256 4-bit storage locations. Each storage location corresponds to a four quadword block of data stored in the data stram 50, with each of the four valid bits corresponding to a quadword within the block. Thus, like the tag stram 52, the quadword valid stram is addressed by the eight bits 12:5 of the virtual address.

Further, however, the individual quadword valid bits must also be independently addressable in order to determine if a particular ISTREAM quadword requested by the IBUFFER 30 is valid. A multiplexer 56 is connected to the 4-bit output of the quadword valid stram 54. The select input of the multiplexer 56 is connected to quadword identifying bits 4:3 of the virtual address. For example, a request from the IBUFFER 30 for the quadword stored at location 000000000000000000001111111101000 results in the four quadword valid bits stored at location 11111111 of the quadword valid stram being delivered to the multiplexer 56. Bits 4:3 of the virtual address indicate that the first quadword (location 01) is the desired quadword. Thus, the select lines of the multiplexer 56 cause the quadword valid bit corresponding to the selected quadword to be delivered at the multiplexer output.

Finally, the fourth group of VIC strams 58 contains valid bits for each block stored in the data stram 50. Thus, the block valid stram 58 contains 256 1-bit storage locations and is addressed by bits 12:5 of the virtual address. Not only is it necessary for the VIC 28 to "know" which quadwords within a block are valid, but also, the VIC 28 needs to verify that the block itself is valid. At this time it is sufficient to understand that the block valid bit must be set before the VIC 28 will allow the selected quadword to be transferred to the IBUFFER 30. However, it should be noted that the block valid stram actually consists of two sets of strams to speed operation of the VIC 28 during a flush. At any given time, a selected one of the two sets of strams stores the block valid bits which reflect the current status of the data in the VIC 28. The addressed block valid bit, representing the validity of the addressed block of data in the VIC 28, is selected by a multiplexer 236 as either the "BLOCK_A_VALID" bit from the first set of strams (set A), or the "BLOCK_B_VALID" bit from the second set of strams (set B). This aspect of the VIC 28 is discussed in greater detail in conjunction with the description of the operation of the circuit shown in FIG. 9.

During an IBUFFER request for a selected quadword of ISTREAM, the virtual address contained in the PC 26 is delivered to the VIC 28. The VIC 28 responds to the request by determining if the requested quadword is present in the data stram 50 and, if so, whether it is valid. Bits 31:13 of the PC virtual address are delivered to one input of a 19-bit comparator 60. The second input to the comparator 60 is connected to the output of the tag stram 52. Previously, bits 31:13 of the address of the quadword stored in the data stram 50 were stored in the tag stram 52. Therefore, those previously stored bits 31:13 are presented as the second input to the comparator 60. If the two addresses match, the asserted output of the comparator 60 is delivered as one input to the 3-input AND gate 62. At the same time, the block and quadword valid bits are also delivered as inputs to the AND gate 62. Accordingly, if any of the three signals is not asserted, the AND gate 62 produces a MISS signal. Conversely, if all three signals are asserted, the AND gate 62 produces a HIT signal. A MISS signal initiates a request to the main cache 22, while a HIT signal causes the data STRAM 50 to deliver the selected quadword of data.

The PC 26 is actually constructed of several separate program counters. During each system clock cycle, one of two PCs (PREFETCH PC or MTAG) is selected and its virtual address is delivered to the VIC 28. Generally, the virtual address contained in the PREFETCH PC is selected and delivered to the VIC 28. The PREFETCH PC always points to the next quadword that the IBUFFER is likely to accept. In sequential code the PREFETCH PC is incremented by one quadword each time the IBUFFER accepts ISTREAM from the VIC 28. When the ISTREAM branches, the PREFETCH PC is loaded with the correct destination address.

However, when ISTREAM is requested from and delivered by the main cache 22, the virtual address contained in the MTAG is selected and delivered to the VIC 28. When the VIC 28 receives multiple quadwords of ISTREAM from the main cache 22, the address of the VIC 28 must be incremented by a quadword in each cycle of the main cache response. The PREFETCH PC would serve this purpose if the instruction decoder 32 could always consume all of the ISTREAM as it arrives from the main cache 22. In practice this is not always possible. Therefore, a second PC, independent from the PREFETCH PC, is used to store the ISTREAM in the VIC 28. Once the response from the main cache 22 is complete, the PREFETCH PC is again used to address the VIC 28. The MTAG is loaded with the previous value of the VIC address when there is no request to the main cache 22.

Figure 4:
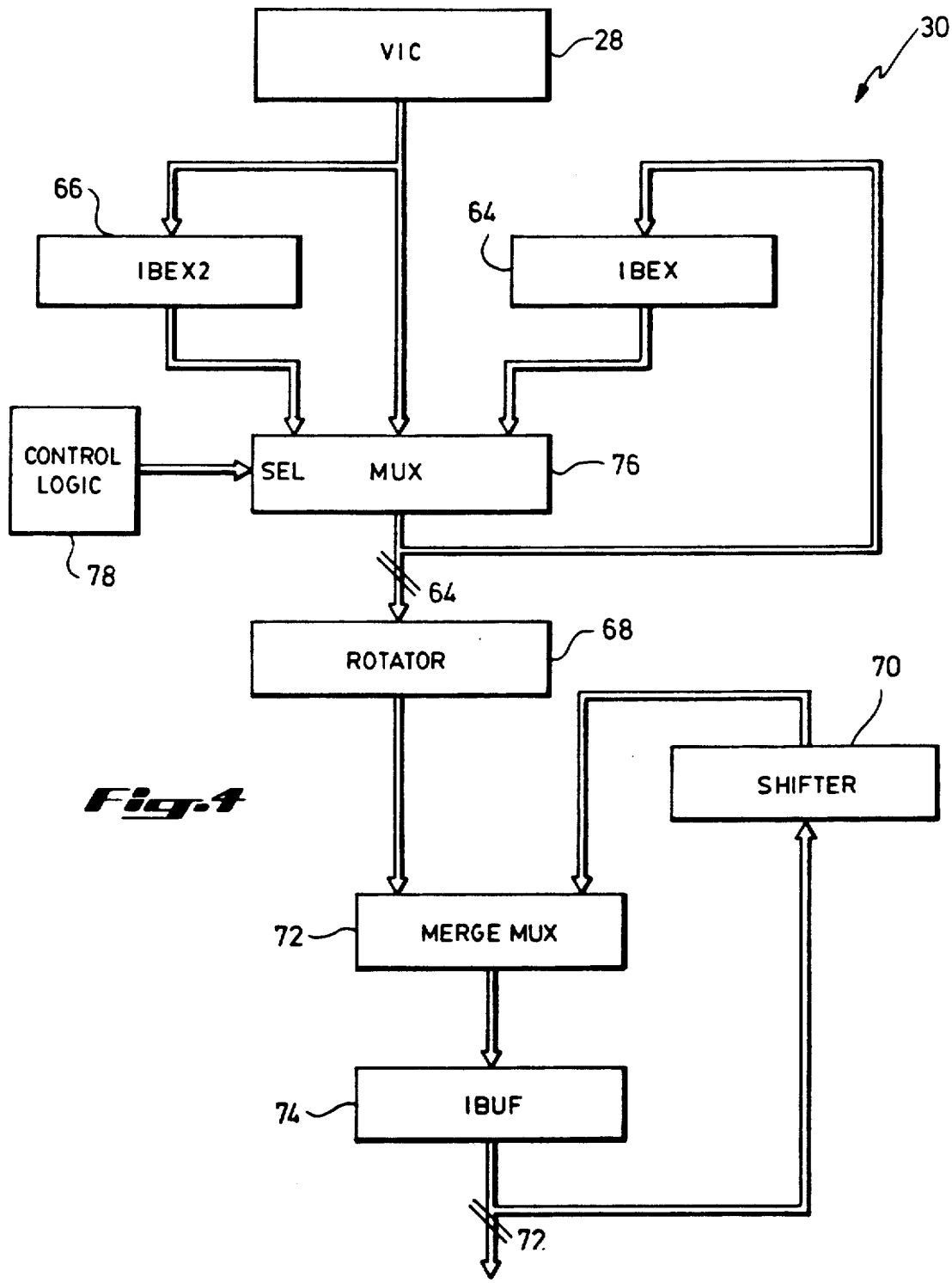
FIG. 4 is a general block diagram of the instruction buffer interfaced with the virtual instruction cache.

Referring now to FIG. 4, the IBUFFER 30 is illustrated. The IBUFFER 30 aligns the data for decoding and performs the function of increasing the processing speed of the instruction unit 18 by prefetching subsequent sequential instructions. The IBUFFER 30 retrieves a selected quadword of the ISTREAM and positions that quadword, such that the instruction decoder 32 receives the instruction with the opcode positioned in the zero byte location. In order to accomplish this complex task of repositioning the ISTREAM, the IBUFFER 30 is separated into five major functional sections: IBEX 64 & IBEX2 66, ROTATOR 68, SHIFTER 70, MERGE MULTIPLEXER 72, and IBUF 74.

Rather than simply increase the size of the instruction decoder 32 to contain more bytes of the ISTREAM, a pair of prefetching buffers IBEX 64 and IBEX2 66 are disposed intermediate the decoder 32 and the VIC 28. IBEX 64 and IBEX2 66 are quadword buffers functionally positioned between the VIC 28 and the IBUF 74 and operate to retrieve the next sequential quadword of ISTREAM while the decoder 32 is operating on the present instruction. This prefetching normally hides the time required for a VIC access by performing the instruction fetch during the time in which the decoder 32 is busy. Any one of the quadwords stored in the VIC 28 is controllably storable in the IBEX 64 and IBEX2 66. As discussed previously, the PREFETCH PC controls operation of the VIC 28 to select and deliver a quadword of ISTREAM. The quadword currently selected by the PREFETCH PC is stored in the IBEX 64 while the next subsequent quadword of ISTREAM is retrieved from the VIC 28 and stored in the IBEX2 66.

The purpose of the IBEX 64 and IBEX2 66 is to prefetch the subsequent two quadwords of ISTREAM and sequentially provide these bytes of ISTREAM to fill the IBUF 74 as each instruction is consumed by the instruction decoder 32. It should be noted that the present computer system preferably employs an instruction set which is of the variable length type. Accordingly, until the instruction decoder 32 actually decodes the opcode of the instruction, the number of bytes dedicated to the instant instruction is not "known" by the IBUFFER 30. Therefore, the IBUFFER 30 does not "know" how many bytes will be consumed by the instruction decoder 32 and will need to be refilled by the IBUFFER 30. Thus, the logic which controls the operation of the IBEX 64, IBEX2 66, and VIC 28 must be capable of determining the number of bytes needed to fill the decoder 32, which location or multiple locations contain the desired bytes, and whether those bytes are valid.

The control logic for operating the IBEX 64, IBEX2 66, and VIC 28 includes a multiplexer 76 with control logic 78 operating the select inputs of the multiplexer 76. The IBEX 64, IBEX2 66, and VIC 28 each includes an 8-byte wide data path connected to the inputs of the multiplexer 76 such that any input may be selected by the control logic 78 and delivered over an 8-byte wide data path to the rotator 68 and to the IBEX 64. The IBEX2 66 is connected directly to the VIC 28 and receives the next sequential quadword of ISTREAM over the 8-byte data path therebetween. Operation of the multiplexer 76 and control logic 78 is discussed in greater detail in conjunction with the description accompanying FIGS. 9 and 10.

The merge multiplexer 72, rotator 68 and shifter 70 interact to maintain the 9-byte instruction decoder 32 filled with the next nine sequential bytes of ISTREAM. As the decoder 32 completes the decoding stage of each instruction, those consumed bytes are shifted out and discarded by the shifter 70. The rotator 68 acts to provide the next sequential bytes of ISTREAM to replace those bytes which were discarded. In this manner, the instruction buffer 30 attempts to provide at least the next 9-bytes of ISTREAM to the instruction decoder 32. Therefore, independent of the length of the present instruction, the decoder 32 is assured that for the majority of instructions (relatively few instructions require more than 9 bytes) the entire instruction is present and available for decoding.

The IBUF 74 is a 9-byte register for storing the results of the merge multiplexer 72 until the decoder 32 is available to accept the ISTREAM. Further, the output of the IBUF 74 is also connected to the input of the shifter 70.

Figure 5:
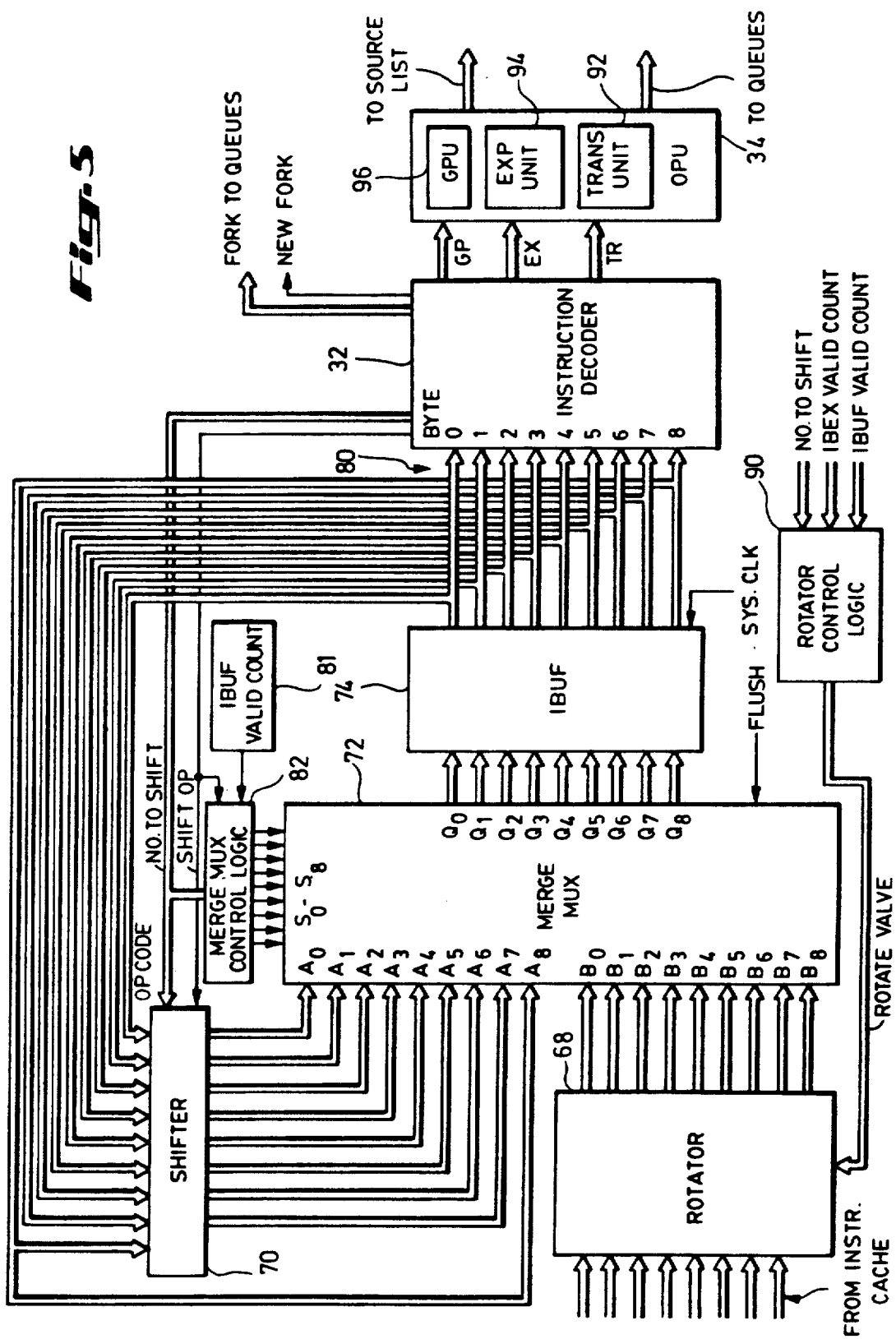
FIG. 5 is a detailed block diagram of the instruction buffer and the interface to the instruction decoder.

Turning now to FIG. 5, the data paths to and from the instruction decoder 32 are shown in greater detail. In order to simultaneously decode a number of operand specifiers, the IBUF 74 is linked to the instruction decoder 32 by a data path 80 for conveying the values of up to nine bytes of an instruction currently being decoded. Associated with the eight bits of each byte is a parity bit for detecting any single bit errors in the byte, and also a valid data flag for indicating whether the IBUF 74 has, in fact, been filled with data from the VIC 28 as requested by the program counter 26.

The instruction decoder 32 decodes a variable number of specifiers depending upon the particular opcode being decoded, the amount of valid data in the IBUF 74, and whether the downstream stages in the pipeline are available to accept more specifiers. Specifically, the instruction decoder 32 inspects the opcode to determine the number of subsequent bytes which are associated with that particular instruction. The decoder 32 checks the valid data flags to determine how many of the associated specifiers can be decoded, and then decodes these specifiers in a single cycle. The instruction decoder 32 delivers a signal indicating the number of bytes that were decoded in order to remove these bytes from the IBUF 74. For example, if the opcode includes four bytes of associated specifiers, the decoder inspects the valid bytes to ensure that these four bytes are valid and then decodes these specifiers. Thereafter, the decoder instructs the shifter 70 to remove the opcode and the consumed four bytes and move the upper four bytes into the low order four byte locations. This shifting process is effective to move the next opcode into the zero byte location of the IBUF 74.

The IBUF 74 need not be large enough to hold an entire instruction, so long as it may hold at least three specifiers of the kind which are typically found in an instruction. The instruction decoder 32 is somewhat simplified if the byte 0 position of the IBUF 74 holds the opcode while the other bytes of the instruction are shifted into and out of the IBUF 74. In effect, the IBUF 74 holds the opcode in byte 0 and functions as a first-in, first-out buffer for byte positions 1 through 8. The instruction decoder 32 is also simplified by the operating criteria that only the specifiers for a single instruction are decoded during each cycle of the system clock. Therefore, at the end of a cycle in which all of the specifiers for an instruction will have been decoded, the instruction decoder 32 transmits a "shift opcode" signal to the shifter 70 in order to shift the opcode out of the byte 0 position of the IBUF 74 so that the next opcode may be received in the byte 0 position.

The VIC 28 is preferably arranged to receive and transmit instruction data in blocks of multiple bytes of data. The block size is preferably a power of two so that the blocks have memory addresses specified by a certain number of most significant bits in the address provided by the program counter 26. For example, in the preferred embodiment, each block consists of 32-bytes or four quadwords and is addressed by a 32-bit address. Thus, bits --5 are unique for each block. Further, owing to the instructions being of variable length, the address of the opcodes within the ISTREAM occur at various positions within the block. To load byte 0 of the IBUF 74 with the next opcode to be executed, which may occur at any byte position within a block of instruction data from the cache, the rotator 68 is disposed in the data path from the VIC 28 to the IBUF 74. The rotator 68, as well as the shifter 70, are comprised of cross-bar switches. The data path from the VIC 28 includes eight parallel busses, one bus being provided for each byte of the ISTREAM.

In the general case, it is necessary to keep track of the number of valid bytes in the IBUF 74. The number of valid bytes at any particular instance is kept in a register called IBUF VALID COUNT 81. The value of this register is the previous IBUF VALID COUNT minus the number of bytes shifted plus the number of new bytes merged through MERGE MUX 72. Similarly it is necessary to know how many bytes remain in IBEX 74. Any bytes that have been moved into the IBUF 74 are considered invalid. As IBUF 64 becomes full the remaining bytes from the quadword of data or a complete new quadword are stored in IBEX. The number of valid bytes in IBEX is stored in a 'virtual' register called IBEX VALID COUNT. This is not a hardware register but the output from combinational logic that produces either, the previous IBEX VALID COUNT minus the number of bytes merged into the IBUF 74 if IBEX is being selected into MUX 76, or eight bytes minus the number of bytes merged into the IBUF 74 if IBEX 2 or VIC is selected into MUX 76.

At the beginning of a program or after a branch or jump instruction is executed, it is desirable to load the IBUF 74 with entirely new data from the VIC 28. For this purpose, combinational logic 82 controlling the merge multiplexer 72 receives a IBUF VALID COUNT of zero so that all of the select lines S0–S8 are not asserted and the merge multiplexer 72 selects data from only the B0 to B8 inputs. Since none of the instructions in the IBUF 74 are valid they are discarded, and only the new instructions contained in ROTATOR 68 are presented to the IBUF 74.

In order to load new ISTREAM into the IBUF 74 from the VIC 28, the MERGE MUX 72 is used to select the number of bytes from the ROTATOR 68 to be merged with a select number of bytes from the shifter 70. If the signal SHIFT OP is asserted the output of the SHIFTER 70 will be the IBUF 74 bytes 0 through 8 shifted down by the number to shift, otherwise if SHIFT OP is not asserted the output of the shifter will be IBUF 74 byte 0 in position A0 with IBUF 74 bytes 1 through 8 shifted down by the number of bytes to shift.

Also when the IBUF 74 is initially loaded, there will be an offset between the address corresponding to the opcode in the data from VIC 28. In particular, this offset is given by the least significant bits of the program counter 26. As shown in FIG. 5 a quadword of ISTREAM (eight bytes) is delivered to the ROTATOR 68, thus using the three least significant bits from the program counter 26 as the rotate value the opcode byte is delivered to the B0 input of merge mux 72. For example, if the program branches to B0D 16 i.e., the fifth byte of the second quadword in a block. The quadword address is B08 16, the least significant three bits are 5, so when the VIC provides the quadword the ROTATOR 67 rotates by 5 bytes and delivers byte 5 to the B0 input of MERGE MUX 72.

In the general case, though, the rotate value is calculated using the formula:

rotate value = 8 − IBEX_VALID_COUNT−(IBUF_VALID_COUNT−NO._BYTES_TO_SHIFT)

For example, if there are nine valid bytes in the IBUF 74 and three in IBEX (bytes 5, 6, 7 of a quadword) and the number of bytes to shift is two, the rotate value is minus two, therefore the rotator shifts up by two (as the result was negative). Thus, the rotator 68 delivers byte 5 of the quadword in IBEX 64 to the B7 input on merge mux 72, and byte 6 to B8 (byte 7 is of no interest as it will not be merged, it is however, delivered to the B0 input). Positive rotate values will cause the ROTATOR 68 to shift down. Thus, combinational logic 90 controlling the rotator 68 calculates the relevant rotate value.

The control for the MERGE MUX in combinational logic 82 produces individual select lines S0–S8 for the merge mux 72 such that the relevant bytes from the SHIFTER and ROTATOR are delivered to the IBUF 74. If SHIFT OP is not asserted then S0 always selects the A0 input such that the opcode byte remains in byte 0 of the IBUF 74. The remaining selects are calculated as follows:

MERGE_VALUE = IBUF_VALID_COUNT−NO._BYTES_TO_SHIFT; any select (S1–S8) less than MERGE_VALUE selects the SHIFTER 70, and the rest select the ROTATOR 68.

For example, if there are eight valid bytes in the IBUF 74 and the number to shift is three, the merge value is five so S1, S2, S3, S4 select the output from the SHIFTER 70 but S5, S6, S7, S8 select the output from the ROTATOR 68.

Since the ROTATOR 68 receives eight bytes of data but transmits nine bytes to the MERGE MUX 72, the nine bytes delivered to B0–B8 inputs are never all valid. The ninth byte gets the same data as the first byte but it is only valid when the rotate value is negative.

Once an opcode has been loaded into the byte 0 position of the IBUF 74, the instruction decoder 32 examines it and the other bytes in the IBUF 74 to determine whether it is possible to simultaneously decode up to three operand specifiers. The instruction decoder 32 further separates the source operands from the destination operands. In particular, in a single cycle of the system clock, the instruction decoder 32 may decode up to two source operands and one destination operand. Flags indicating whether source operands or a destination operand are decoded for each cycle are transmitted from the instruction decoder 32 to the OPU 34.

The instruction decoder 32 simultaneously decodes up to three register specifiers per cycle. When a register specifier is decoded. its register address is placed on the transfer bus TR and sent to the source list queue 38 via a transfer unit 92 in the OPU 34.

The instruction decoder 32 may decode one short literal specifier per cycle. According to the VAX instruction architecture, the short literal specifier must be a source operand specifier. When the instruction decoder 32 decodes a short literal specifier, the short literal data is transmitted over a bus (EX) to an expansion unit 94 in the OPU 34.

Preferably the instruction decoder 32 is capable of decoding one complex specifier per cycle. The complex specifier data is transmitted by the instruction decoder 32 over a general purpose bus (GP) to a general purpose unit 96 in the OPU 34.

Once all of the specifiers for the instruction have been decoded, the instruction decoder 32 transmits the "shift op" signal to the shifter 70. The instruction decoder 32 and also transmits a microprogram "fork" address to a fork queue in the queues 36, as soon as a valid opcode is received by the IBUF 74.

Figure 6:
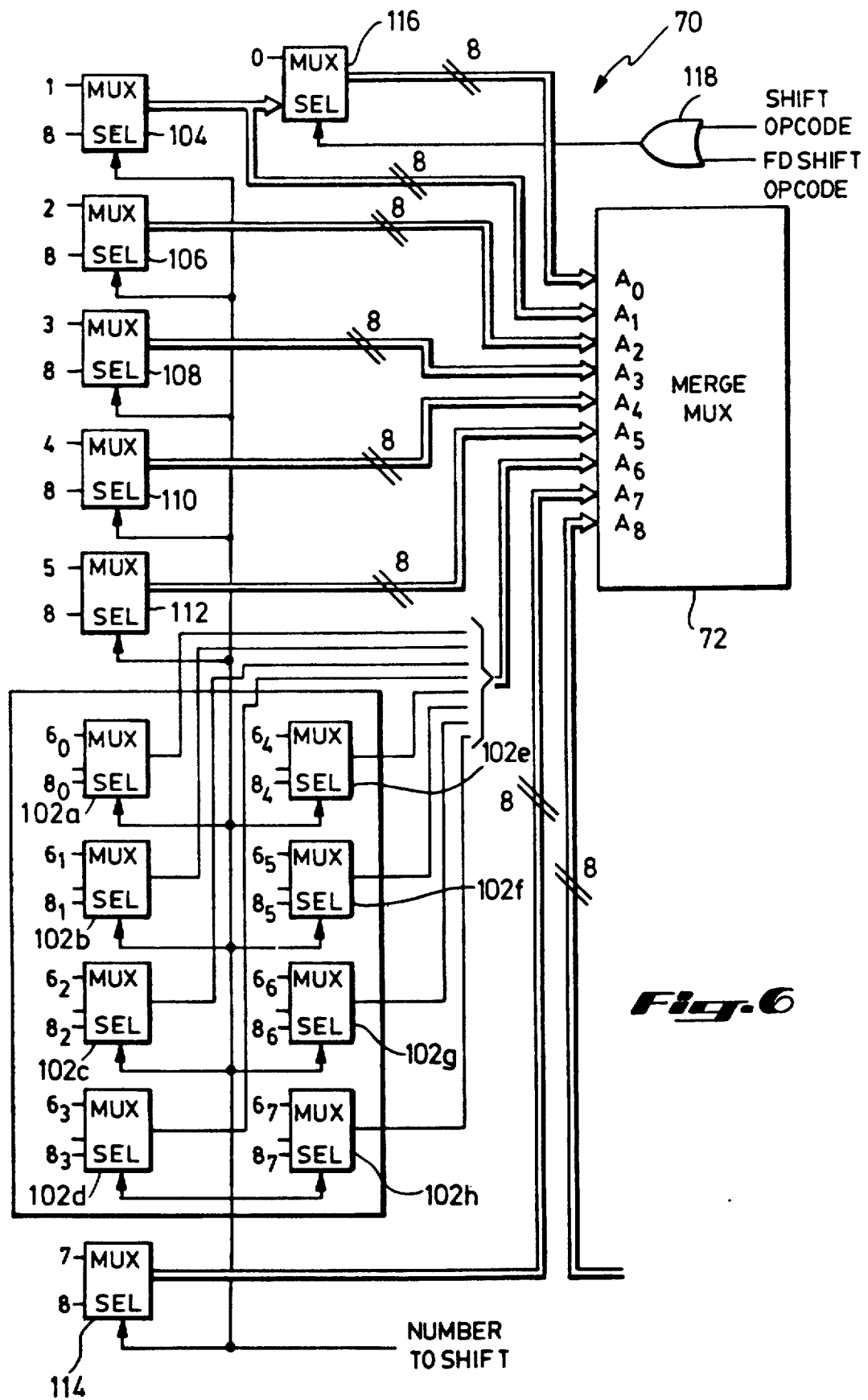
FIG. 6 is a schematic diagram of the shifter of the instruction buffer.

Referring now to FIG. 6, a schematic diagram of the shifter 70 is shown. The $A_0-A_8$ byte inputs of the merge multiplexer 72 are illustrated connected to the 8-bit outputs of a bank of multiplexers which comprise the shifter 70. It should be remembered that the purpose of the shifter 70 is to move the unused portion of the instruction stream contained in the IBUF 74 into those bytes of the IBUF 74 which were previously consumed by the instruction decoder 32. For example, if, during the previous cycle, the instruction decoder 32 used the three lowest bytes (0, 1, 2) of the IBUF 74, then in order to properly present the next instruction to the decoder 32, it is preferable to shift the remaining valid six bytes (3-8) into the low order six bytes of the IBUF 74.

Accordingly, the consumed low order bytes are no longer of any immediate use to the decoder 32 and are discarded. Thus, the shifter 70 need only move high order bytes into low order byte positions and does not rotate the low order bytes into the high order byte positions. This requirement simplifies the shifter configuration for the higher order bytes since each byte position only receives shifted bytes from those positions which are relatively higher. For example, byte position six only receives shifted bytes from its two higher order positions (7 and 8), while byte position one receives shifted bytes from its seven higher order positions (2-8).

To better describe this process, the internal configuration of one of the multiplexer banks is illustrated and generally shown at 102. The multiplexer bank 102 receives bytes 6, 7, and 8 from the IBUF 74 and delivers an output to the $A_6$ input of the merge multiplexer 72. Within the multiplexer bank 102 is a group of eight 3-input multiplexers 102a-102h. The multiplexer 102a receives the zero bit of each of the input bytes 6, 7, and 8 at input locations 0, 1, and 2 respectively. Similarly, the multiplexers 102b-102h receive bits 1-7 respectively of the three input bytes. The select lines for each of the multiplexers 102a-102h is connected to the instruction decoder 32 and carries the 3-bit signal "number to shift". The "number to shift" signal is, of course, the number of bytes that were consumed by the instruction decoder 32.

Therefore, it can be seen that the select lines of the multiplexers 102a-102h act to deliver all eight bits of the selected byte. For example, if the decoder 32 consumes two bytes of the ISTREAM, then the contents of the IBUF 74 are shifted by two bytes, such that byte eight is moved into sixth byte location. Accordingly, the "number to shift" signal is set to the value two, thereby selecting the third input to the multiplexers 102a-102h. Thus, the byte eight position is selected and delivered to the merge multiplexer input $A_6$.

The internal structure of the remaining multiplexer banks 104-114 are substantially similar, varying only in the number of input bytes. The multiplexer bank 114 has an output connected to the $A_7$ input of the merge multiplexer 72. The inputs to the multiplexer 114 include only bytes 7 and 8 of the IBUF 74. The multiplexer bank 112 has an output connected to the $A_5$ input of the merge multiplexer 72. The inputs to the multiplexer 112 include bytes 5, 6, 7, and 8 of the IBUF 74. The multiplexer bank 110 has an output connected to the $A_4$ input of the merge multiplexer 72. The inputs to the multiplexer 110 include bytes 4, 5, 6, 7, and 8 of the IBUF 74. The multiplexer bank 108 has an output connected to the $A_3$ input of the merge multiplexer 72. The inputs to the multiplexer 108 include bytes 3, 4, 5, 6, 7, and 8 of the IBUF 74. The multiplexer bank 106 has an output connected to the $A_2$ input of the merge multiplexer 72. The inputs to the multiplexer 106 include bytes 2, 3, 4, 5, 6, 7, and 8 of the IBUF 74.

The multiplexer bank 104 differs slightly from the other multiplexer banks, in that its output is directly connected to the merge multiplexer 72 and also the zero byte position of the IBUF 74. The byte zero case is additionally complicated by a requirement that in addition to the shifter 70 being capable of moving any of the higher order bytes into the zero byte position, the shifter 70 must also be capable of retaining the current zero byte while the remaining bytes are shifted. This feature is desired because byte zero contains the opcode. Thus, if the specifiers extend beyond the length of the IBUF 74, then the consumed bytes must be shifted out and new specifiers rotated in, but the opcode must remain until the entire instruction is decoded. Accordingly, the inputs to the multiplexer 104 include bytes 1, 2, 3, 4, 5, 6, 7, and 8 of the IBUF 74. However, the output of the multiplexer 104 is delivered to one input of a bank of multiplexers 116. The second input to the multiplexer bank 116 is connected to the zero byte position of the IBUF 74. A single bit select line is connected to the instruction decoder 32 through an OR gate 118, so that when the instruction decoder 32 issues either a "shift opcode" or an "FD shift opcode" signal, the select line is asserted and the output of the multiplexer 104 is delivered to the $A_0$ input of the merge multiplexer 72. Otherwise, if neither of these signals is asserted, then byte 0 is selected and delivered to the $A_0$ input of the merge multiplexer 72.

Figure 7:
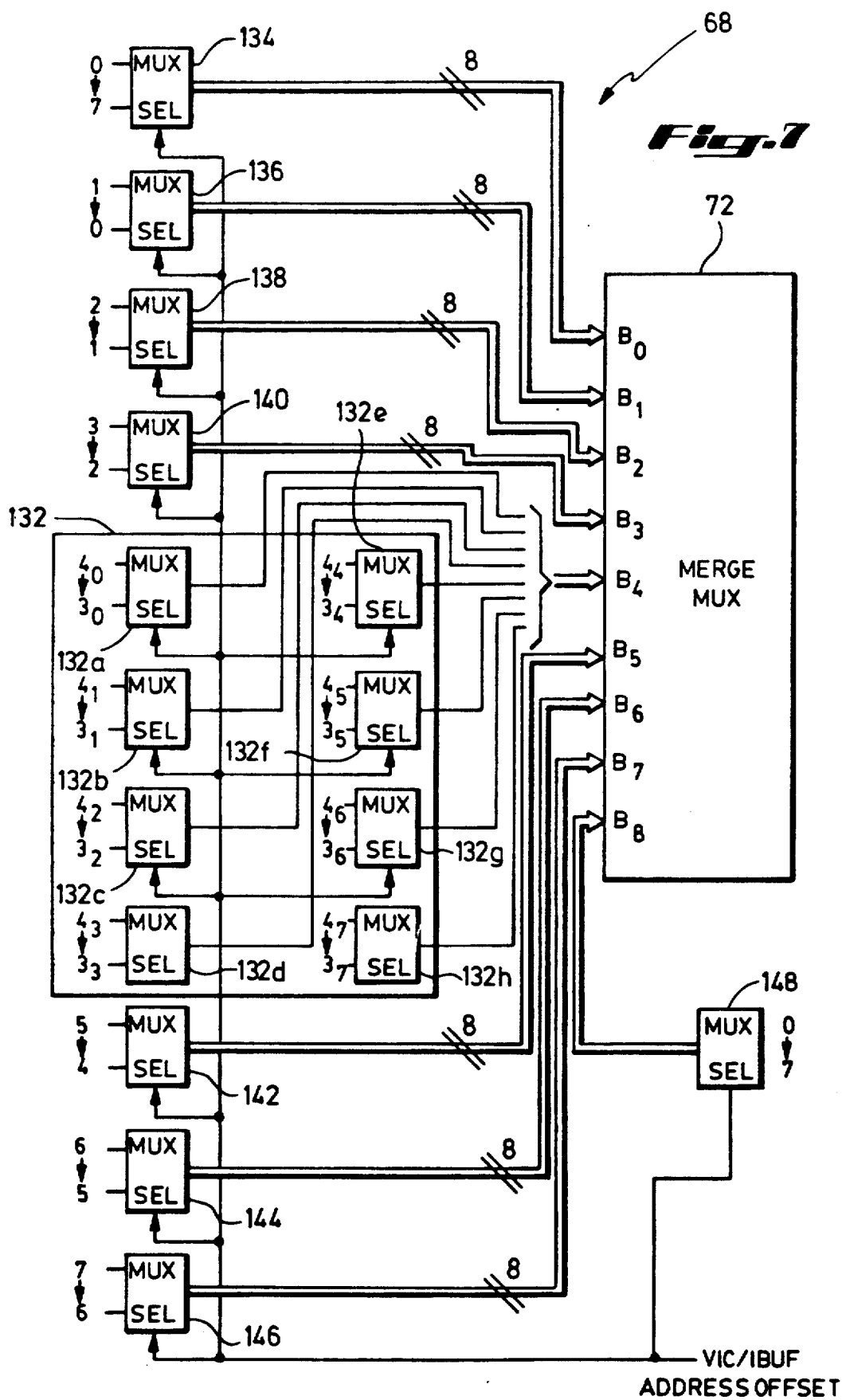
FIG. 7 is a schematic diagram of the rotator of the instruction buffer.

Referring now to FIG. 7, there is shown a schematic diagram of the rotator 68. The $B_0-B_8$ byte inputs of the merge multiplexer 72 are illustrated as connected to the 8-bit outputs of a bank of multiplexers which comprise the rotator 68. It should be remembered that the purpose of the rotator 68 is to rotate the next quadword of ISTREAM so that the merge multiplexer 72 can fill the IBUF 74 with the valid low order bytes of the shifter 70 and the rotated high order bytes of the rotator 68. Further, unlike the shifter (70 in FIG. 5), each of the multiplexer banks in the rotator 68 is capable of delivering any of the input bytes at its output.

For example, if, during the previous cycle, the instruction decoder 32 uses the three lowest bytes (0, 1, 2) of the IBUF 74, then the shifter 70 moves the remaining valid six bytes (3-8) into the low order six bytes (0-5) of merge multiplexer inputs $A_0$-$A_5$. Thus, the rotator 68 rotates its low order three bytes into positions 6, 7, and 8 so that the merge multiplexer 72 can combine $A_0$-$A_5$ and $B_6$-$B_8$ to fill the IBUF 74. The low order three bytes available from the multiplexer 76 could be the low order three bytes of IBEX2 66 or the VIC 28 or any three consecutive bytes of IBEX 64.

To better describe this process, the internal configuration of one of the multiplexer banks is illustrated and generally shown at 132. The multiplexer bank 132 receives bytes 0-7 from either the VIC 28, IBEX 64, or IBEX2 66, as described in conjunction with FIGS. 4, 9, and 10. The output of the multiplexer bank 132 is delivered to the $B_4$ input of the merge multiplexer 72. Within the multiplexer bank 132 is a group of eight 8-input multiplexers 132a-132h. The multiplexer 132a receives the zero bit of each of the input bytes 0-7 at multiplexer 132a input locations 4-3 respectively. Similarly, the multiplexers 132b-132h receive bits 1-7 respectively of all of the eight input byte. The select lines for each of the multiplexers 132a-132h receives the 3-bit rotate value as described in conjunction with FIG. 5. The signal is, of course, the number of bytes positions that the ISTREAM should be rotated to properly fill the IBUF 74.

It can be seen that if the rotate value is selected to be a value of three by the rotator control logic 90, the multiplexers 132a-132h will each select the input located at position three. Accordingly, bits 0-7 of input byte seven are selected and delivered to the $B_4$ input of the merge multiplexer 72. Therefore, in response to a request for a three byte rotate, the input byte seven is delivered to byte position four.

The remaining multiplexer banks 134-148 are substantially similar to the multiplexer bank 132, differing only in the order in which the input bytes are connected to the multiplexer banks 132-148. For example, the same request for a three byte rotate causes multiplexer bank 140 to deliver the sixth input byte to byte position three ($B_3$).

Consider now the combined affect of the operation of the rotator 68 and shifter 70. Assume both IBUF 74 and IBEX 64 are full. Also assume that the decoder 32 has consumed the low order three bytes of the IBUF 74. The decoder 32 produces a value of three as the "number to shift" signal. The shifter 70 responds to this signal by relocating the ISTREAM so that positions $A_0$-$A_8$ of the merge multiplexer 72 respectively receive positions 3, 4, 5, 6, 7, 8, 6, 7, 8. At the same time the rotator control logic 90 delivers the rotate value to the rotator 68. The rotate value is set to the value minus six. Accordingly, the rotator 68 rotates its contents so that positions $B_0$-$B_8$ of the merge multiplexer 72 respectively receive positions 3, 4, 5, 6, 7, 8, 0, 1, 2. Therefore, the merge multiplexer successfully combines the two inputs to deliver the next nine bytes of ISTREAM to the IBUF 74 by selecting inputs $A_0$-$A_5$ and $B_6$-$B_8$.

Figure 8:
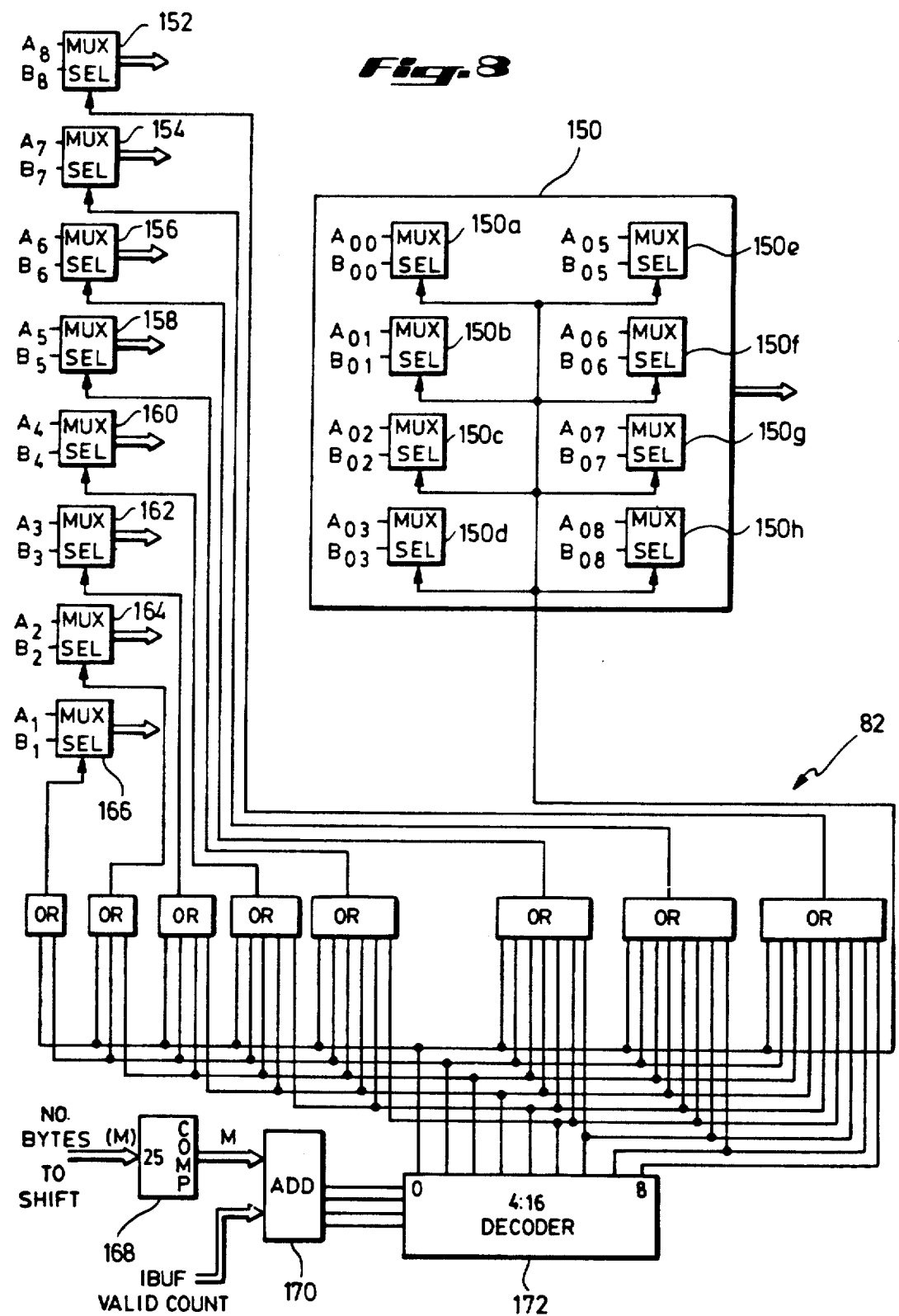
FIG. 8 is a schematic diagram of the merge multiplexer of the instruction buffer.

Referring now to FIG. 8, there is shown a schematic diagram of the merge multiplexer 72 and merge multiplexer control logic 82. It should be remembered that the merge multiplexer 72 operates under control of the logic 82 to select the next nine bytes of ISTREAM from the two sets of 9 byte inputs from the rotator 68 and shifter 70. Generally, the low order bytes are selected from the shifter 70 while the rotator 68 fills the remaining high order byte positions.

The control logic 82 receives the "number to shift" signal (m) and the IBUF VALID COUNT and uses the values of these signals to select the proper input bytes.

The merge multiplexer 72 includes nine banks of multiplexers 150, 152, 154, 156, 158, 160, 162, 164, 166 with each bank receiving two byte position inputs, one byte each from the rotator 68 and shifter 70. Thus, the select line connected to each bank of multiplexers is asserted to select the rotator input and unasserted to select the shifter input.

To better describe this process, the internal configuration of one of the multiplexer banks is illustrated and generally shown at 150. The multiplexer bank 150 receives bits 0-7 from the zero byte position of both the shifter 70 ($A_{00}$-$A_{07}$) and rotator 68 ($B_{00}$-$B_{07}$). The output of the multiplexer bank 150 is delivered to the zero byte position of the IBUF 74. Contained within the multiplexer bank 150 is a group of eight 2-input multiplexers 150a-150h. The multiplexer 150a receives the zero bit of both of the zero position input bytes such that an asserted value on the select line delivers $B_{00}$ and an unasserted value delivers $A_{00}$. Similarly, the multiplexers 150b-150h receive bits 1-7 respectively of both of the input bytes. The select lines for each of the multiplexers 150a-150h receives a 1-bit select signal from the priority decoder 82 in order to commonly deliver all eight bits of the selected byte to the zero input position of the IBUF 74.

Within the control logic 82, the "number to shift" signal (m) is subtracted from the IBUF VALID COUNT to determine the lowest order byte position into which the rotator inputs should be delivered. The signal m is delivered to a 1s complement generator 168 to convert the signal m into a negative value. The signal $-m$ is delivered to an adder 170 which performs the arithmetic operation and delivers the result to a 4:16 decoder 172. Accordingly, the lower order nine output bits of the decoder produce a single asserted signal at the numeric position corresponding to the lowest order byte position into which the rotator inputs should be delivered. Therefore, this asserted byte position and all higher order byte positions should be asserted to properly select rotator inputs at the corresponding multiplexers.

For example, as discussed previously, if the "number to shift" signal is set to a value of three, then the rotator inputs should be selected for byte positions 6 through 8. The output of the decoder 172 asserts only the line corresponding to byte position 6. Thus, a bank of OR gates 174 are connected to the outputs of the decoder 172 to provide asserted signals to the multiplexers corresponding to the asserted line and all higher order byte positions.

During normal operation the "number to shift" signal controls the operation of the merge multiplexer 72. However, at the beginning of a program or at a context switch, the "number to shift" signal is zero and the IBUF VALID COUNT is zero and the entire contents of the rotator 68 are loaded into the IBUF 74. Therefore, the output of the adder 170 is zero, enabling all of the outputs of the bank of OR gates 82. Thus, the select lines to the multiplexers 150-166 all act to select the B inputs and pass the entire contents of the rotator to the IBUF 74.

The control logic 78 for operating the multiplexer 76 of FIG. 4 selects either IBEX 64, IBEX2 66 or VIC 28 according to the following priority scheme.

The control logic 78 selects IBEX 64, IBEX2 66 or VIC 28 with a simple priority algorithm. If IBEX is not empty then IBEX 64 is delivered to the ROTATOR 68, otherwise if IBEX2 is valid it is delivered to the ROTATOR 68 and if both IBEX is empty and IBEX2 is not valid VIC data is delivered to the ROTATOR 68.

IBEX is loaded each cycle with the data delivered by MUX 76 but it is marked empty either on a FLUSH or when all valid data on the ROTATOR 68 is consumed by the IBUF 74. In other words, IBEX VALID COUNT becomes non-zero when MUX 76 provides data to ROTATOR 68 that cannot find a place in IBUF 74. For example, after a branch or jump instruction has been executed IBUF 74, IBEX 64 and IBEX2 66 are cleared (FLUSHED) and the VIC is accessed for the new ISTREAM. Assume it branches to the first byte of a block that is in the VIC 28. The first quadword from the VIC 28 is presented to MUX 76 this passes the data through the ROTATOR 68 and MERGE MUX to IBUF 74. IBEX is loaded with the data but is not marked valid as all eight bytes went into the IBUF 74. In the following cycle the VIC 28 presents the second quadword to MUX 76 which passes it to the ROTATOR 68. Now assuming the DECODER 32 decodes less than eight bytes, say four bytes, the SHIFTER 70 shifts out 4 bytes, the ROTATOR 68 rotates by four and the MERGE MUX 82 passes four bytes from the shifter 70 and five bytes from the ROTATOR 68 then IBEX contains three unused bytes of ISTREAM, so IBEX VALID COUNT is set to three.

IBEX2 can be a stall buffer for the VIC 28. Because of the pipelined nature of creating a new prefetch address, accessing the VIC strams then checking for a VIC HIT it is impractical to stop this process as soon as IBEX contains some valid bytes. Thus data from the VIC 28 is loaded into IBEX2 66 the cycle after IBEX 64 is loaded with some valid data and IBEX2 66 is marked valid if it is a VIC HIT. Taking the above example, where a branch to the first byte of a valid block in the VIC 28 is executed. The address of the first quadword is moved to PREFETCH PC in the first cycle. In the second cycle the first quadword is delivered to IBUF 74 and PREFETCH PC moves on to the second quadword. In the third cycle, the second quadword is delivered to IBUF 74 and IBEX 64 and the PREFETCH PC moves to the third quadword. In the fourth cycle, assuming DECODER 32 consumes no more bytes, the third quadword is delivered to IBEX2 and PREFETCH PC moves to the fourth quadword and we decide to stall. In the fifth cycle the VIC 28 delivers the fourth quadword to MUX 76 but IBEX 64 data is passed to the ROTATOR 68.

As can be seen in the above example, prefetching of ISTREAM can move significantly ahead of the instruction in the IBUF. One benefit of the VIC 28 is that accesses to the main cache 22 are significantly reduced. However, this benefit will be severely reduced if prefetching continues too far ahead of the decoded instruction stream. On average, a branch instruction occurs once in every sixteen bytes of ISTREAM so it is essential that prefetching does not access the main cache 22 unless there is a reasonable chance the data will be used. Thus, a request to the main cache for data is only made if there is a VIC MISS, IBEX2 is not valid and IBEX is empty. This usually means seven or eight bytes are still available to the DECODER 32 when the request for a VIC block is made.

Figure 9:
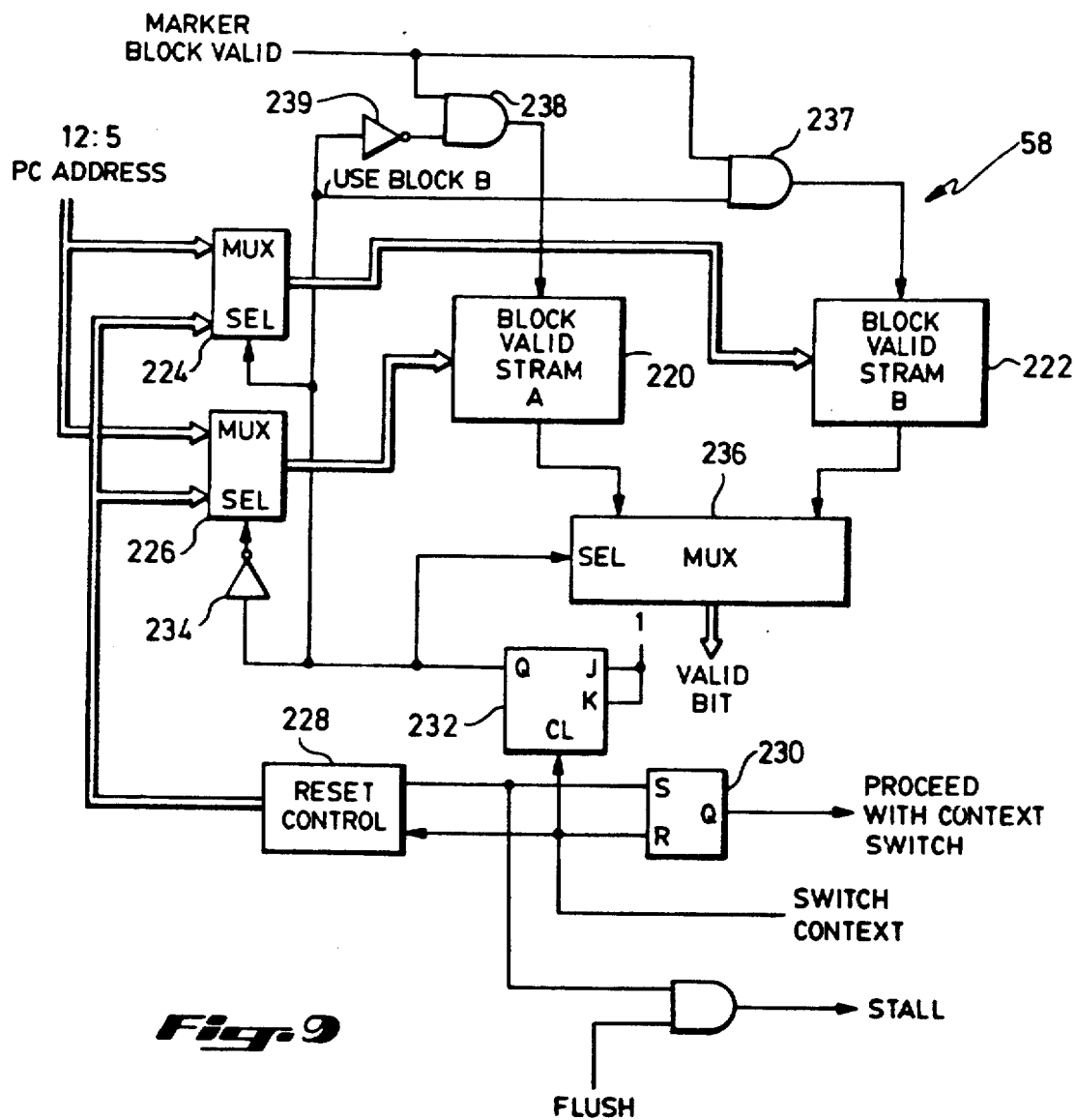
FIG. 9 is a block diagram of the two-unit valid block store strams of the virtual instruction cache.

Referring now to FIG. 9, there is shown a block diagram of the two-unit valid block store stram 58 of the virtual instruction cache 28. Since the VIC 28 is a virtual cache, it must be flushed on a context switch or REI instruction. In other words, all 256 of the 1-bit storage locations must be marked as invalid. Unfortunately, only one storage location can be marked as invalid during each clock cycle. Accordingly, it is possible that if all 256 bits are set to their valid condition, then it takes 256 clock cycles to clear the block valid stram 58.

As shown in FIG. 9, there are two block valid strams 220, 222 (BVSA, BVSB). One of the strams is used to determine if the presently requested address "hits" or "misses" in the VIC 28. While the first stram is determining hit/miss the second stram is being cleared at the rate of one storage location during each clock cycle. Therefore, assuming that 256 cycles have elapsed since the last context switch, then the second stram is clear and a context switch is accomplished in only a single cycle by switching the functions of the two strams. It should be appreciated that each stram 220, 222 is configured to perform either hit/miss determination or valid bit clearing. In fact, each context switch causes BVSA and BVSB to switch to the opposite function.

BVSA and BVSB each receive a single 8-bit address from respective multiplexers 224, 226. Both of the multiplexers 224, 226 receive a pair of addresses from the PC 26 and a reset control 228. In order to present the PC address to one of the strams 220, 222 and the reset address to the other stram 220, 222, the select lines to the multiplexers 224, 226 are operated in a complementary fashion.

The reset control 228 receives a CONTEXT SWITCH signal from the execution unit 20 and begins to sequentially present address 0–255 to the multiplexers 224, 226. One of the multiplexers 224, 226 passes these sequential addresses to the selected strams 220, 222, such that the 256 valid bits contained therein are reset over a period of 256 clock cycles.

In order to prevent the execution unit from initiating a context switch before one of the strams 220, 222 is reset, the reset control delivers a handshaking signal to indicate that the reset process is complete. An S-R flip flop 230 receives the handshaking signal at its set input, causing the flip flop 230 to latch a PROCEED WITH CONTEXT SWITCH SIGNAL to the execution unit 20. The SWITCH CONTEXT signal from the execution unit 20 is also connected to the reset input of the flip flop 230 so that the PROCEED WITH CONTEXT SWITCH signal is reset at the beginning of each context switch.

Control of the select lines to the multiplexers 224, 226 is provided by a J-K flip flop 232 which toggles between asserted and unasserted in response to each CONTEXT SWITCH signal. Both inputs of the flip flop 232 are connected to a logical "1" and the clock input is connected to the CONTEXT SWITCH signal. Thus, the Q output (USE BLOCK B) of the flip-flop 232 switches between "0" and "1" in response to a transition in the SWITCH CONTEXT signal. The select input of the multiplexer 224 is connected directly to the Q output of the flip-flop 232, while the select input of the multiplexer 226 is connected to the Q output of the flip-flop 232 through an inverter 234.

In a similar fashion the block valid data (MARKER BLOCK VALID) from the PC unit (26 in FIG. 1) is multiplexed between the data inputs of the strams 220, 222 in response to the USE BLOCK B SIGNAL. For this purpose, the data input of the "B" stram 222 is connected to the MARKER BLOCK VALID line through an AND gate 237 which is enabled by the USE BLOCK B signal, and the data input of the "A" stram 220 is connected to the MARKER BLOCK VALID line through an AND gate enabled by the complement of the USE BLOCK B signal as provided by an inverter 239. Therefore, when the USE BLOCK B signal is asserted, the MARKER BLOCK VALID data is fed into the "B" stram 222 while the "A" stram receives zero data and is therefore cleared. Conversely, when the USE BLOCK B signal is not asserted, the MARKER BLOCK VALID data is fed into the "A" stram 222 while the "B" stram receives zero data and is therefore cleared.

Finally, the valid bit outputs of the strams 220, 222 are connected to a pair of inputs to a multiplexer 236. The select line of the multiplexer 236 is also connected to the Q output of the flip flop 232 to operate in conjunction with the multiplexers 224, 226. Accordingly, the stram 220, 222 which is selected to receive the PC address is also selected to deliver its output as the BLOCK VALID BIT.

We claim:

1. An instruction buffer system for a digital computer for controlling the delivery of instruction stream bytes between a memory and an instruction decoder, said instruction stream bytes being grouped together into variable length instructions, and said instruction decoder for decoding each of said bytes within said variable length instruction, the instruction buffer system comprising:
an instruction buffer coupled between said memory and said instruction decoder and having multiple byte locations for receiving a first series of said instruction bytes, at least a portion of said first series of instruction bytes forming a variable length instruction to be decoded by said decoder
first and second prefetch buffers for storing a preselected number of a second, subsequent series of bytes of instruction stream,
means for delivering a shift signal responsive to the number of bytes of instruction stream contained in the variable length instruction currently being decoded by said decoder,
a shifter for receiving said shift signal and shifting the contents of said instruction buffer by a preselected number of bytes responsive to said number of decoded bytes of instruction stream indicated by said shift signal,
means for merging said shifted bytes with at least a portion of the contents of one of said first and second prefetch buffers, and delivering said merged bytes to said instruction buffer,
means for refilling said first prefetch buffer with sequential bytes of said instruction stream when said first prefetch buffer is emptied, and
means for refilling said second prefetch buffer with sequential bytes of said instruction stream when said second prefetch buffer is emptied.

2. An instruction buffer system, as set forth in claim 1, wherein the merging means includes means for retrieving a preselected number of sequential bytes of instruction stream from one of the first and second prefetch buffers and loading said preselected number of bytes into the buffer locations from which instruction stream bytes have been removed by the shifter, said preselected number of sequential bytes of instruction stream being responsive to said number of decoded bytes of instruction stream indicated by said shift signal.

3. An instruction buffer system, as set forth in claim 2, wherein the merging means includes means for receiving said sequential bytes of instruction stream retrieved from said first and second prefetch buffers and rotating the bytes by a preselected number of byte locations responsive to said number of bytes of instruction stream indicated by said shift signal before refilling said instruction buffer.

4. An instruction buffer system, as set forth in claim 1, wherein said means for refiling the first and second prefetch buffers refills the first and second prefetch buffers in response to the absence of said shift signal.

5. An instruction buffer system, as set forth in claim 1, including means for retrieving instruction stream bytes from the memory in response to both of said first and second prefetch buffers being empty of instruction stream bytes.

6. An instruction buffer system for a digital computer for controlling the delivery of instruction stream to an instruction decoder, said instruction stream being grouped into variable length instructions, and said instruction decoder for decoding each of said bytes within said variable length instruction, said instruction buffer system comprising:
an instruction buffer having a plurality of storage locations for receiving a preselected number of the next sequential bytes of instruction stream desired by the decoder and delivering said preselected number of instruction stream bytes to said decoder;
said instruction decoder for delivering a shift signal responsive to the number of bytes of the instruction stream located in the instruction buffer which are currently being decoded;
first means for prefetching and maintaining in a first prefetch buffer a first preselected number of sequential bytes of the instruction stream;
second means for prefetching and maintaining in a second prefetch buffer a second preselected number of sequential bytes of the instruction stream, said second preselected number of sequential bytes of the instruction stream being subsequent to the first preselected number of sequential bytes of the instruction stream;
a shifter coupled to said instruction buffer and adapted for receiving said shift signal and shifting the bytes of said instruction buffer by a preselected number of storage locations responsive to said shift signal and delivering the shifted bytes to the instruction buffer;
means for retrieving sequential bytes of the instruction stream from one of the first and second prefetch buffers and filling the instruction buffer storage locations from which bytes of the instruction stream have been removed by the shifter;
means for refilling said first prefetch buffers with instruction stream bytes in response to said first prefetch buffers being emptied by said means for retrieving; and
means for refilling said second prefetch buffer with instruction stream bytes in response to said second means being emptied by said means for retrieving.

7. An instruction buffer system, as set forth in claim 6, wherein the instruction buffer refilling means includes means for receiving said sequential bytes of instruction stream retrieved from said first and second means and rotating the bytes by a preselected number of byte locations responsive to said shift signal before refilling said instruction buffer.

8. An instruction buffer system, as set forth in claim 6, wherein said means for refilling said first and second prefetch buffers refills said first and second prefetch buffers in response to the absence of said shift signal.

9. An instruction buffer system, as set forth in claim 6, wherein said means for retrieving includes means for retrieving instruction stream from a memory in response to said first and second prefetch buffers being empty.

* * * * *